(12) United States Patent
Blank

(10) Patent No.: US 10,136,594 B2
(45) Date of Patent: Nov. 27, 2018

(54) AEROPONIC GROWING SYSTEM AND METHOD

(71) Applicant: Timothy A. Blank, Plymouth, FL (US)

(72) Inventor: Timothy A. Blank, Plymouth, FL (US)

(73) Assignee: TOWER GARDEN, LLC, Collierville, TN (US)

( * ) Notice: Subject to any disclaimer, the term of this patent is extended or adjusted under 35 U.S.C. 154(b) by 1231 days.

(21) Appl. No.: 13/719,348

(22) Filed: Dec. 19, 2012

(65) Prior Publication Data

US 2014/0000162 A1     Jan. 2, 2014

Related U.S. Application Data

(60) Provisional application No. 61/648,667, filed on May 18, 2012.

(51) Int. Cl.
    *A01G 31/06*      (2006.01)

(52) U.S. Cl.
     CPC ............ *A01G 31/06* (2013.01); *Y02P 60/216* (2015.11)

(58) Field of Classification Search
     CPC ........ A01G 31/02; A01G 9/023; A01G 9/022; A01G 31/06; A01G 31/00; A01G 2031/006
     USPC ......... 47/59 R, 62 A, 62 R, 62 N, 82, 83, 67
     See application file for complete search history.

(56) References Cited

U.S. PATENT DOCUMENTS

| | | | | |
|---|---|---|---|---|
| 4,216,617 | A * | 8/1980 | Schmidt | 47/62 A |
| 4,574,520 | A * | 3/1986 | Arledge | 47/59 R |
| 4,628,631 | A * | 12/1986 | Van Wingerden | 47/65 |
| 6,230,440 | B1 * | 5/2001 | Deutsch | 47/67 |
| 7,877,928 | B2 * | 2/2011 | Jeong | 47/62 R |
| 7,984,586 | B2 * | 7/2011 | Brusatore | 47/59 R |
| 2005/0081441 | A1 * | 4/2005 | Mantovani | 47/67 |
| 2006/0032128 | A1 * | 2/2006 | Bryan, III | 47/62 R |
| 2006/0162252 | A1 * | 7/2006 | Lim | 47/59 R |
| 2011/0061296 | A1 * | 3/2011 | Simmons | 47/62 A |
| 2013/0067814 | A1 * | 3/2013 | Riley et al. | 47/62 R |
| 2013/0111812 | A1 * | 5/2013 | Fisher | 47/66.7 |
| 2013/0283689 | A1 * | 10/2013 | Walliser | 47/62 R |
| 2014/0208647 | A1 * | 7/2014 | Carpenter | 47/66.7 |

FOREIGN PATENT DOCUMENTS

| | | | | |
|---|---|---|---|---|
| JP | 04325035 | A * | 11/1992 | A01G 31/00 |
| JP | 2008092859 | A * | 4/2008 | |

OTHER PUBLICATIONS

JP 2008-092859A, machine translation.*

* cited by examiner

*Primary Examiner* — Son T Nguyen
(74) *Attorney, Agent, or Firm* — Matthew G. McKinney, Esq.; Allen, Dyer, Doppelt & Gilchrist, PA

(57) ABSTRACT

An aeroponic growing system and method is disclosed. In a particular embodiment, the system includes at least one vertical column of interconnected growing pots and an overhead support to suspend the vertical column of interconnected growing pots. The system also includes a supply conduit that is in fluid communication with a top of the vertical column of interconnected growing pots and a return conduit in fluid communication with a bottom of the vertical column of interconnected growing pots. In addition, the system includes a reservoir in fluid communication with the supply conduit and the return conduit. A turning mechanism may also be used for rotating the column to achieve uniformity of illumination.

18 Claims, 5 Drawing Sheets

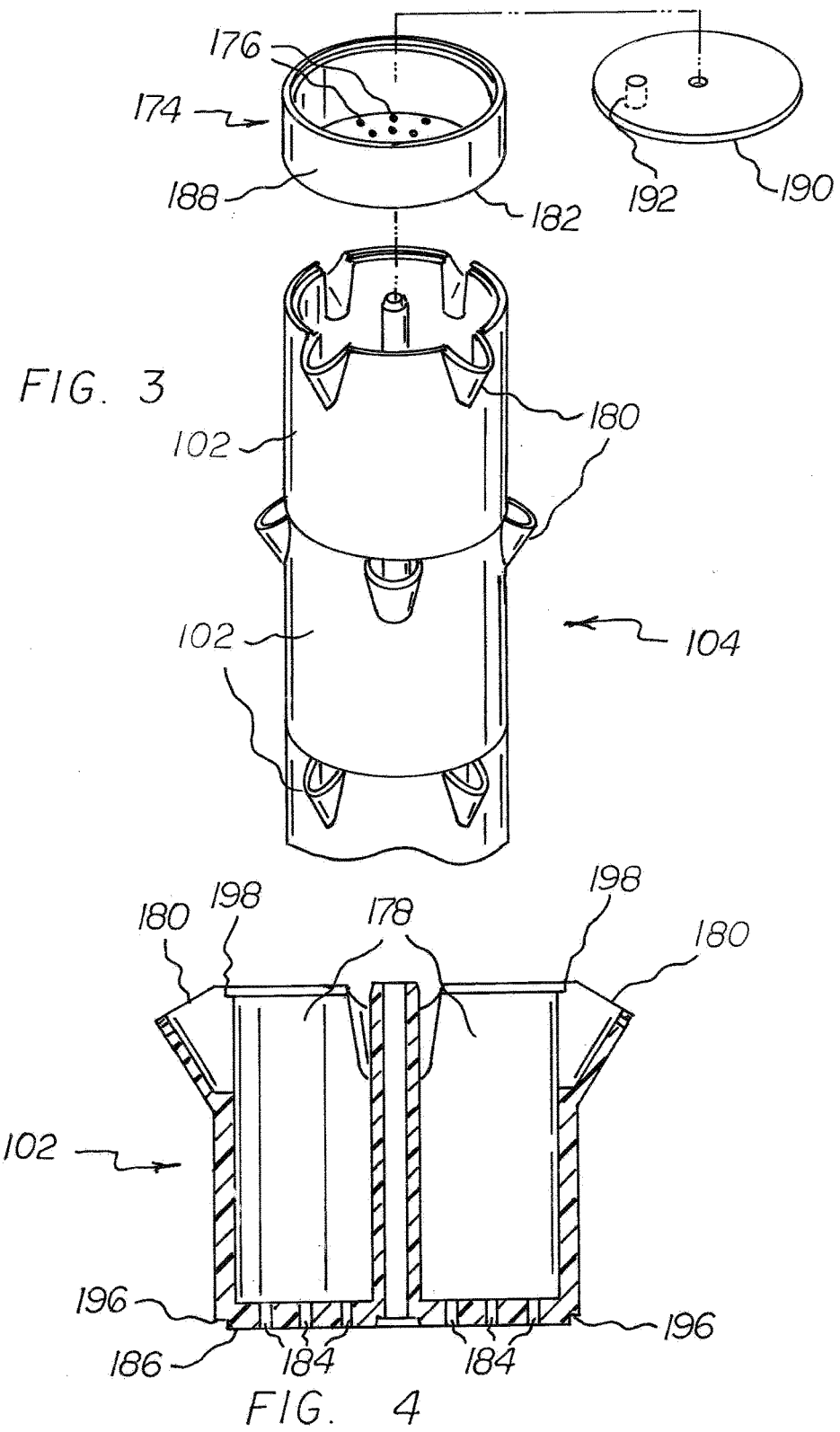

AEROPONIC GROWING SYSTEM AND METHOD

I. CROSS REFERENCE TO RELATED APPLICATIONS

This application claims the benefit of U.S. Provisional Patent Application Ser. No. 61/648,667 filed May 18, 2012.

II. FIELD

The present invention relates in general to an aeroponic growing system and method.

III. DESCRIPTION OF RELATED ART

For many years growers have used hydroponic systems to grow vegetation in urban, arid, and space-constrained areas. A special category of hydroponics is termed aeroponics which involves growing plants in an air or mist environment without the use of soil or an aggregate medium (known as geoponics). Aeroponic culture differs from both conventional hydroponics and in-vitro (plant tissue culture) growing. Unlike more conventional hydroponics, which uses water as a growing medium and essential minerals to sustain plant growth, aeroponics does not make use of a growing medium. The combination of root exposure to air along with oxygenation water droplets supplied by the system, promote healthy plant growth. Additionally, plants in an aeroponic air culture apparatus have access to all the ambient carbon dioxide for photosynthesis. Plant pests and diseases are deterred by the lack of a growth medium and aeroponics typically uses one tenth the water of conventional hydroponics.

Various types of conventional aeroponic systems differ in the plant support geometry and method of delivery of water nutrient solution. Included among these various types are those using a nutrient film technique in which a thin film of nutrient solution is caused to flow by net pots in a gutter type support geometry. Deep flow systems use misters to oxygenate and distribute the nutrient and are termed deep flow because they incorporate a riser into the grow chamber to prevent all the nutrient from draining out. Bubbler aeroponics systems are like a bucket deep flow aeroponics system in that the roots hang into the nutrient in the bottom while being sprayed by misters above and/or exposed to bubbles from air stones below. Vertical flow systems use a misting or drip distribution of nutrients by gravity feed.

A number of technologies support aeroponics. These include pumps, valves, fluid filters, piping systems, fluid level sensors, moisture sensors, artificial lighting, timers and electronic controllers, relays and other electrically-controlled actuators, nutrient mixing injectors, and horticultural enclosures.

One of the shortcomings of the existing aeroponic systems is the inability to readily size a system to make it efficient for the particular application. Accordingly, what is needed in the art is an aeroponic system that is modular and can be scaled and adapted to particular environments and also a system that is energy, water, and nutrient efficient.

With respect to illumination, a typical plant grow light produces light wavelengths from 380 nm (UV) up to and beyond 880 nm (IR), however, plants only use certain groups of light wavelengths from the visible light spectrum (400 nm-700 nm). The wavelengths associated with green and yellow colors appear brighter to the human eye than red and blue colors, which are the primary colors used by plants for photosynthesis. Incandescent and fluorescent lighting are designed to light rooms but not necessarily design to be used as plant grow lights. In the past, manufacturers modified incandescent and fluorescent light bulbs and added impurities to get more of the colors that plants need to grow. As much as 82% of the light coming out of a typical plant light is not absorbed by plants or is in the form of UV light or heat.

LED grow lights offer an alternative to incandescent and fluorescent lights. For example, LED grow lights use LEDs that generate more of the particular colors of light needed to target wavelengths for plant growth. Thus, growers are able to use several colors of LEDs and select particular colors depending on the crop growing. Thus, LED grow lights are more efficient than incandescent and fluorescent light bulbs by eliminating colors of light that are not required for plant growth.

The light from existing LED light bars is emitted in a cone shape from above the plants. Mounting the bars too close to plants will prevent the light from individual clusters from blending properly before reaching the plant canopy. While coverage area increases as the LED grow lighting is moved further from the plant canopy, the light intensity decreases. When using multiple light bar arrays, increasing the distance from the plant canopy allows clusters from multiple light bars to overlap.

However, placing a light bar above of the plant canopy does not allow sufficient light to reach the lower portions of plants, nor is the light bar effective in a vertical growing system. Accordingly, there is a need for a system that provides sufficient light to plants from the canopy to the lower portions of the plant, and also provides sufficient light to plants growing in a vertical system.

Other aspects, advantages, and features of the present disclosure will become apparent after review of the entire application, including the following sections: Brief Description of the Drawings, Detailed Description, and the Claims.

IV. SUMMARY

In a particular embodiment, an aeroponic growing system is disclosed. The system includes at least one vertical column of interconnected growing pots and an overhead support to suspend the vertical column of interconnected growing pots. In addition, the system includes a supply conduit in fluid communication with a top of the vertical column, a return conduit in fluid communication with a bottom of the vertical column, and a reservoir in fluid communication with the supply conduit and the return conduit. Further, the system includes a nutrient enriched fluid to re-circulate through the system. A turning mechanism may be used for rotating the column to achieve uniformity of illumination and the system may also include a regulator to adjust a temperature of the fluid circulating through the system. A light tower may be used and orientated vertically to emit light from a top of the vertical column of interconnected growing pots to the bottom.

In another particular embodiment of an aeroponic growing system, the system includes a plurality of vertical growing towers, where the towers are arranged in adjacent rows and columns. A suspension shaft is configured to suspend and rotate each of the growing towers. The system also includes a supply conduit in fluid communication with a top portion of each of the growing towers and a return conduit in fluid communication with a bottom portion of each of the growing towers. A reservoir is in fluid communication with the supply conduit and the return conduit and configured to re-circulate a nutrient rich fluid through the growing towers.

In another particular embodiment, an aeroponic method is disclosed. The method includes forming at least one growing tower from a plurality of interconnected growing pots and suspending the at least one growing tower from an overhead support. In addition, the method includes supplying a nutrient rich fluid to a top portion of the growing tower and collecting the fluid from a bottom portion of the growing tower after the fluid has traveled down the growing tower. The method also includes recirculating the fluid to the top portion of the growing tower.

V. BRIEF DESCRIPTION OF THE DRAWINGS

FIG. 3 is a perspective view of a growing tower used with the system;

FIG. 4 is a cross-sectional view of a pot used with the growing tower;

VI. DETAILED DESCRIPTION

Figure 1:
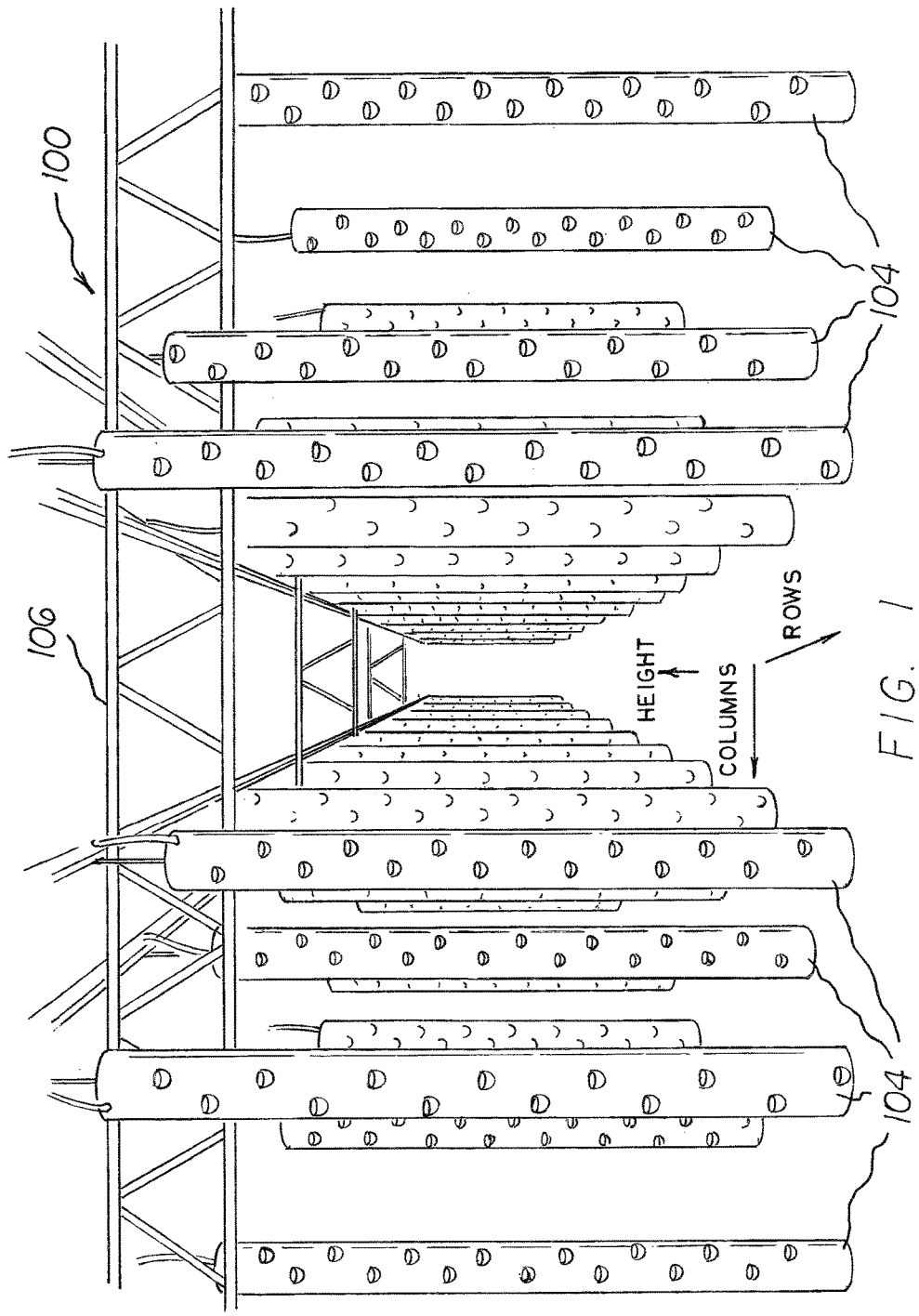
FIG. 1 is a perspective view of a particular embodiment of an aeroponic system.

An aeroponic growing system is disclosed. The growing system 100 provides a modular, three-dimensional array of rows and columns of aeroponic growing towers as shown in FIG. 1. The system 100 is adjustable along any of the three dimensions (length, width, height), thereby facilitating a flexible spatial footprint. Further, the footprint of the system 100 allows more plants to be grown and harvested per square foot than any other existing system. The three-dimensional array of the system 100 is capable of size adjustment along the vertical dimension by selecting a number of growing pots 102, which are described below in reference to FIG. 3, to construct the vertical tower 104 to any height. For example, to increase the height of the tower 104, additional growing pots 102 are added and stacked on top of one another. Similarly, to reduce the size of the towers 104, growing pots 102 are removed from the stack. In an alternative embodiment, the vertical tower 104 is constructed as single element at a desired height instead of separate elements (i.e., pots 102) stacked together. In addition, adjustment along the lateral dimensions is made by adding and removing the number of growing towers 104 along each row and column being supported by the overhead structure 106.

Figure 2:
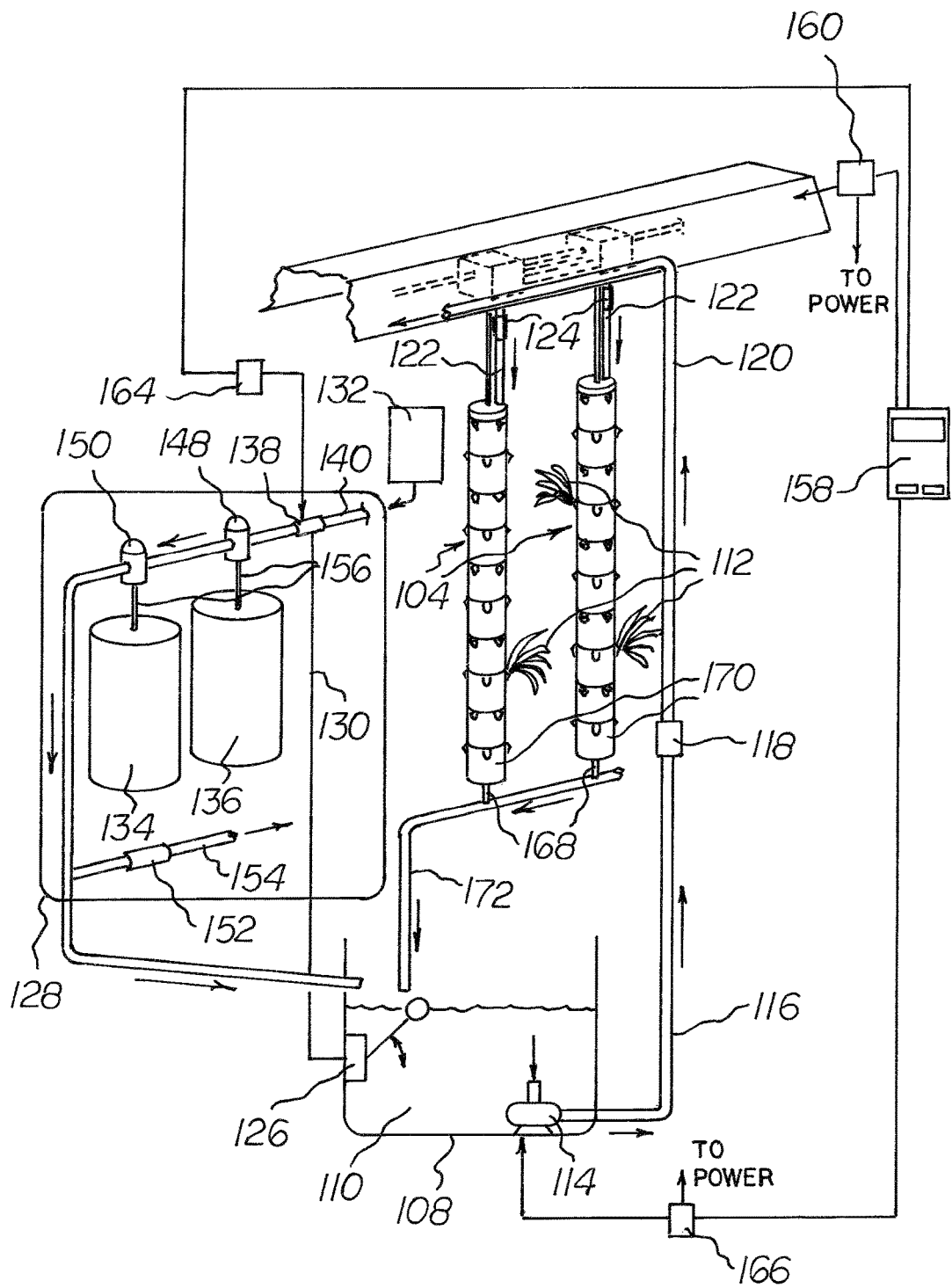
FIG. 2 is a schematic diagram of a particular embodiment of the aeroponic system.

Referring now to FIG. 2, the system 100 includes a reservoir 108 that is used to contain a volume of nutrient solution 110, where the nutrient solution 110 is used to circulate through the system 100 and supply nutrients to the plants 112 growing in the towers 104. The system 100 is also configured to allow the nutrient solution 110 to gravity flow back to the reservoir 108 after circulating through the growing towers 104. Thus, the reservoir 1108 may be located at a lower elevation than the other components of the system 100. The reservoir 108 may be buried in the ground to hide it from view and also to insulate the reservoir 108 and the nutrient solution 110 from extreme hot and cold ambient temperatures. However, the reservoir 108 may not be located below the system 100 where the system 100 is constructed on a rooftop, for example, or wherever locating the reservoir 108 at a lower elevation is not feasible. The size of the reservoir 108 required is dependent on the size of the growing system 100. For example, the reservoir 108 may be a five hundred fifty gallon tank.

A supply pump 114 is used to distribute the nutrient solution 110 to the plants 112. The supply pump 114 may be in the reservoir 108 or may be outside the reservoir 108. Wherever the supply pump 114 is located, the supply pump 114 is used to draw the nutrient solution 110 from the reservoir 108 and to provide the necessary volume of the nutrient solution 110 to the plants 112 in the towers 104. In a particular embodiment, the difference in level of the nutrient solution 110 in the reservoir 108 and the top of the growing towers 104 may be approximately fourteen feet requiring a ½ horsepower supply pump 114, for example. The size of the reservoir 108 and the size of the supply pump 114 may be correlated with the size of the system 100 and the number of plants 112 of the system 100.

The supply pump 114 is connected to a supply line 116 that is used to deliver the nutrient solution 110 from the reservoir 108 to the main growing area. A filter 118 removes roots, particles, etc. from the nutrient solution 110 before the solution 110 is delivered to an overhead distribution system for the growing towers 104. The distribution system includes a main line 120 and a distribution line 122 for nutrient solution 110 delivery at each tower 104. A distribution valve 124 is provided between the main line 120 and each distribution line 122 for each tower 104. Accordingly, the grower can shut off the nutrient solution 110 for a particular growing tower 104 as the plants 112 growing therein are being harvested or the nutrient solution 110 is otherwise not needed. In addition, the distribution system may be divided into zones to deliver nutrient solution 110 to selected groups of growing towers 104 as needed.

Replenishment of the reservoir 108 is required as the plants 112 "drink" the nutrient solution 110. A float-based sensor system or other level measuring device 126 may be in communication (by electrical, radio frequency, or optical means, for example) with a dosing system 128 that is configured to automatically turn on to replenish the reservoir 108 with the new nutrient solution 110 when the level in the reservoir 108 drops below a designated point. An electrical signal connection 130 is depicted in FIG. 2. Similarly, the dosing system 128 will shut off when the level measuring device 126 signals that the reservoir 108 has been filled to a predetermined level. Thus, the reservoir 108 is adapted to automatically maintain a relatively constant volume of nutrient solution 110 at all times from which the supply pump 114 may draw. The reservoir 108 may also be subject to periodic manual inspection to determine when the level of the nutrient solution 110 in the reservoir 108 is low and needs to be replenished.

The dosing system 128 may include a fresh water supply 132 and containers of nutrient concentrate 134, 136. The dosing system 128 mixes the fresh water 132 with the nutrient concentrate(s) 134, 136 to produce the nutrient solution 110 that is circulated through the system 100. The nutrient concentrate(s) 134, 136 may be one or more different types of nutrients that are stored separately. In one particular illustrative embodiment of the system, the dosing system 128 opens a freshwater valve 138 that causes a flow through a water line 140, which is in fluid communication with a pair injectors 148, 150. The pair of injectors 148, 150 introduce respective nutrient concentrates 134, 136 into the waterline 140 for delivery to the reservoir 108. For example, one part of the nutrient concentrate may be mixed with "x" parts of water in the waterline 140, where "x" is determined by the injector ratio. A ratio of 1:100 requires one part of nutrient concentrate(s) 134, 136 in combination with ninety-nine parts of water for a total of 100 parts of final nutrient solution 110. In addition, a valve 152 may be used to divert a portion of the nutrient solution 110 to a seedling station via auxiliary pipe 154. The seedling station is where seeds may be germinated to begin the growing process before being transplanted to the tower 104.

The injectors 148, 150 may operate without electricity and use only water pressure to operate. The water drives the injectors 148, 150, which takes up the required amount of nutrient concentrate 134, 136 directly through feed lines 156 of the nutrient concentrates 134, 136. The nutrient concentrates may be stored in fifty-five gallon barrels, for example. Inside the injectors 148, 150, the nutrient concentrate 134, 136 is mixed with the fresh water and the water pressure forces the nutrient solution 110 downstream. The amount of nutrient concentrate 134, 136 is proportional to the volume of water entering the injectors 148, 150 despite variations in water flow or pressure, which may occur in the source waterline 140.

A programmable timer 158 may be connected to electronic relays to govern certain aspects of system 100 operation through control of various types of actuators and electrically-controlled subsystems. For example, the timer 158 is shown connected to relay 160 to control the times, durations, and speed of the tower motors 162 (shown in FIG. 5), or any combination thereof. In addition, a dosing relay 164 may be used with the fresh water valve 138 and a pump relay 166 to control the supply pump 114. The timer 158 may also be used to control an LED grow light subsystem discussed below. Such control can be programmed for seasonal requirements. Typically, the plants 112 require more nutrient solution 110 in the summer season and less during the winter season.

As shown in FIG. 2, a return funnel 168 is located at the lowermost pot 170 of each tower 104 to collect the nutrient solution 110 and drain the nutrient solution 110 into the return line 172 back to the reservoir 108 where the nutrient solution 110 may be recirculated. The flow from a distribution head 174, through the growing tower 104, and back to the reservoir 108 is typically accomplished through gravity flow.

The distribution valve 124 may be used with each growing tower 104, which selectively controls the amount of flow of the nutrient solution 110 to the respective growing tower 104. The distribution valve 124 may be used to adjust the flow depending on the number of pots 102 used to create the respective growing tower 104. In addition, more growing towers 104 may require a higher fluid pressure to pump the nutrient solution 110 to the distribution system. The distribution valve 124 is adjusted to increase or decrease fluid flow to prevent an overflow of nutrient solution 110 in the distribution head 174 when only a few pots 102 are used. In addition, the distribution valve 124 may be adjusted to provide sufficient flow of fluid to the distribution head 174 when, for example, ten pots 102 are stacked together.

In the preferred embodiment, as shown in FIG. 3 and FIG. 4, the distribution valve 124 is adjusted so that a level of the nutrient solution 110 is constantly maintained in the distribution head 174 during a watering cycle, which provides for even distribution of the nutrient solution 110 from drain holes 176 in the distribution head 174 into the hollow interior 178 of the pots 102.

The nutrient solution 110 travels to the bottom of the tower 104 to the collection funnel 168 in fluid communication with the return line 172. The return line 172 for a row of growing towers 104 is slightly sloped to facilitate gravity return feed of the nutrient solution 110 back to the reservoir 108. An exemplary slope is ½ inch per 12 feet of linear distance.

As depicted in FIG. 3, the design of the growing tower 104 is modular in that it includes pots 102 that may be constructed of plastic that are secured to one another to form the growing tower 104. Planting ports 180 are located around the pots 102 for allowing seedlings to be inserted therein. Each pot 102 may include several planting ports 180. The planting ports 180 protrude from the pots 102 and support a plant 112 in a generally upright orientation as the plant 112 grows outward from the respective growing tower 104. The port 180 may be inclined at an angle of 30° to promote the upward growth and support of the plants 112 inserted into planting ports 180. As the nutrient solution 110 trickles from an upper pot to a lower pot, the impact causes the nutrient solution 110 to atomize and create higher oxygen. This is accomplished by the nutrient solution 110 hitting pieces and parts of the pots 102 to cause the droplets to explode into a mist, which is a natural oxygenating process that does not require additional expenditure of energy. Accordingly, the system 100 does not require any separate components for the oxygenation, which promotes a healthier root system of a plant 112, relieving root stress.

In one embodiment, the drain holes 176 in the bottom 182 of the distribution head 174 and drain holes 184 in each bottom wall 186 of the pots 102 may be approximately ¼" in diameter and arranged in radially extending lines from the center of the bottom wall 186. For example, at least three drain holes 176, 184 may be laterally spaced per line and each line being separated by approximately 45° to provide at least twenty-four drain holes.

The distribution head 174 is constructed and arranged to have an interior volume formed by a side wall 188 and the bottom wall 182. A lid 190 may also be used to cover the distribution head 174. The lid 190 prevents rainwater and other elements from entering the growing tower 104 through the distribution head 174. The distribution head 174 is configured to receive the nutrient solution 110 through an aperture 192 in the lid 190. The distribution head 174 is adapted to hold the nutrient solution 110 received from the distribution line 122 for each tower 104. A plurality of drain holes 176 are disposed in the bottom wall 182 of the distribution head 174 and are adapted for distributing the nutrient solution 110 to the respective growing tower 104 situated below the distribution head 174. The distribution head 174 is adapted to maintain a fluid level that provides a consistent continuous flow of the nutrient solution 110 into the respective growing tower 104 so that the solution 110 is evenly distributed during watering cycles.

In a preferred embodiment, the drain holes 176 in the bottom of the distribution head 174 are approximately ⅛" in diameter and arranged in radially extending lines from the center with at least three drain holes 176 being laterally spaced per line and each line being separated by approximately 45° to provide at least twenty-four drain holes 176. The size of drain holes 176 of the distribution head 174 may be smaller than the drain holes 184 of the pots 102 to allow for a restricted flow to help maintain a fluid level above the drain holes 176 during watering. If the drain holes 176 of the distribution head 174 are too large, the nutrient solution 110 will drain to quickly through the first few holes in the line and fail to reach the periphery of the head 174, which will result in inadequate fluid distribution through the respective growing tower 102.

With reference to FIG. 4, a cross-sectional diagram of an individual pot 102 is shown that each of the pots 102 form a hollow module interior 178 where a bottom wall 186 is included in each pot 102 that has a plurality of drain holes 184 forming a partially enclosed bottom end. Each pot 102 also includes an open top end. The bottom wall 186 of the pots 102 may be contoured to include a circumferential groove 196 adapted to engage a complementary groove 198 formed in the top end of each pot 102 to allow adjacent pots 102 to stack in an top-to-bottom arrangement to form the growing tower 104 as shown in FIG. 2. The drain holes 184 of each bottom wall 186 allow the nutrient solution 110 to trickle from a distribution head 174 mounted to the uppermost pot, shown in FIG. 2, to the lower pots and back to the reservoir 108 through a return line 172.

In one embodiment of the present system 100, the plants 112 may be germinated in a growing medium, which are transplanted to a net pot that slides into a port 180 of the pot 102. The growing medium may include rock wool or a netted bag, for example. In a few weeks, living plants 112 may be harvested from the tower 104. Portions of the plant 112 may be fresh cut, for example, kale, or the whole plant 34 may be removed with the roots attached. An example of the latter is arugula, which is harvested with all roots intact. The arugula may be bagged with the roots preserved by wrapping them around the base of the plant. Leaving the roots attached to the plant during harvesting promotes extended viability of the plant and its nutritional value.

Figure 5:
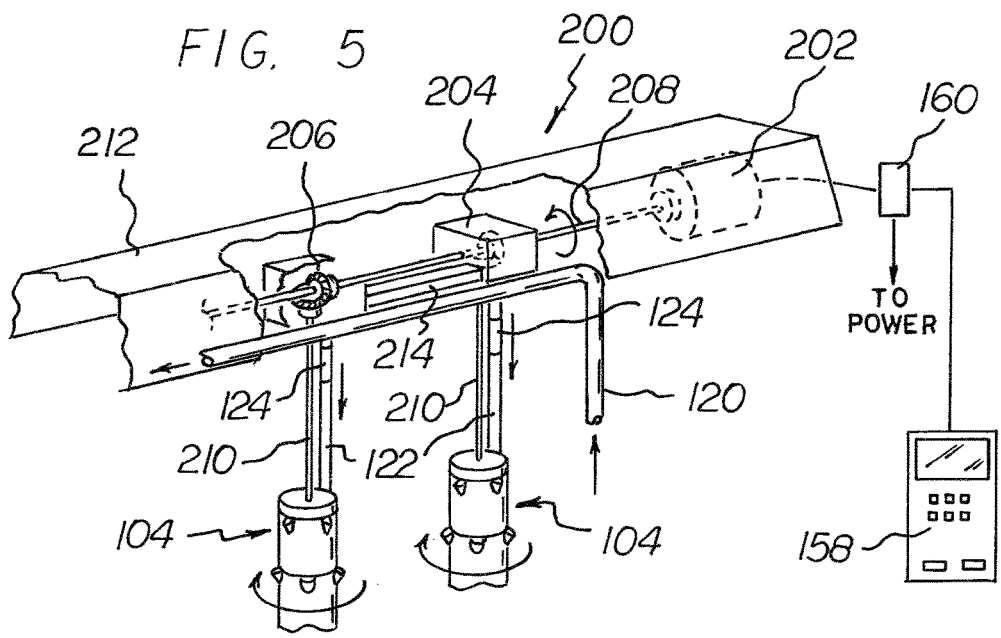
FIG. 5 is a perspective view of a turning mechanism for the growing towers.

A turning mechanism 200 is shown in FIG. 5 as part of the system 100 to increase the uniformity of sunlight exposure for plants 112 grown on the towers 104. The turning mechanism 200 may include at least one driving motor 202, a gear box 204 containing beveled gears 206, a drive shaft 108, and a tower suspension shaft 210 that is disposed through the center of the tower 104 to suspend the tower 104 from the overhead structure 106. In the presence of sunlight, the turning mechanism 200 may be powered by solar energy. Various configurations are anticipated to include one or more motors 202 per row of growing towers 104. In implementations using multiple motors, a single solar panel may be dedicated to running a single motor. The size of the growing operation will dictate the economics of such choice. A support channel 212 is shown having an inverted "U" cross section with the open portion facing down, which serves to protect the turning mechanism 200. In addition, the channel 212 offers protection while working around the system 100 without interfering with the turning mechanism 200 and to protect the turning mechanism 200 from the weather.

At each tower 104, the gear box 204 converts horizontal rotation of the drive shaft 208 into vertical rotation of the suspension shaft 210. Four revolutions a minute is a typical rotation rate, however, the revolution rate will depend on the particular application. A spacer rod 214 may be used between each gear box 204 to dictate the spacing of the towers 104, which is based in part on the size of plants 112 to be grown. Tower spacing is in turn governed by the type of crop and availability of sunlight, where typical spacing is three, one-half feet.

The system 100 includes a modular flexibility to adapt from one pot 102 to twenty pots 102 in a tower 104, with four plants per pot 102, for example. If larger plants are being cultivated, the plants 112 may spaced accordingly at the top, middle, and bottom of the tower 104. For example, tomato or cucumber plants may require additional space to grow so that the plants 112 are not placed in each port 180 of a pot 102. The unused ports 180 may be plugged or left open. In addition, the system 100 is adapted to grow almost any above-ground vegetable and herb by adjusting the configuration. In contrast to the present system, existing hydroponic systems lack the flexibility to grow a variety of plants.

In addition, the system 100 may include means to provide a semi-controlled or controlled environment. Such an environment may include providing an enclosure with ceiling and walls made of horticultural mesh to keep birds out, to diminish heavy rain exposure, and to mitigate harsh direct sunlight. Alternatively, in a geographic area exhibiting very little rain, such an enclosure might not be necessary. In which case, protection of the gearboxes 204 by the support channel 212 may be augmented with structures to shade the plants 112. In addition, artificial light may be used with the system 100 to promote increased growth activity of the plants 112.

Figure 6:
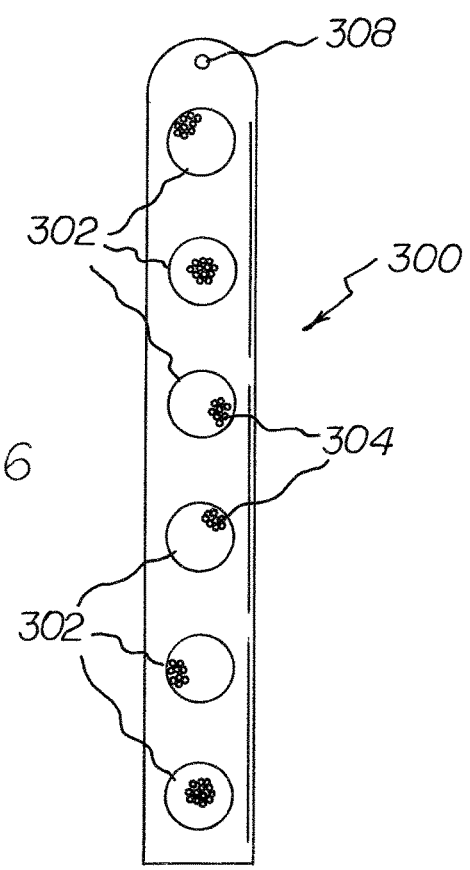
FIG. 6 is a front view of a light tower.
Figure 7:
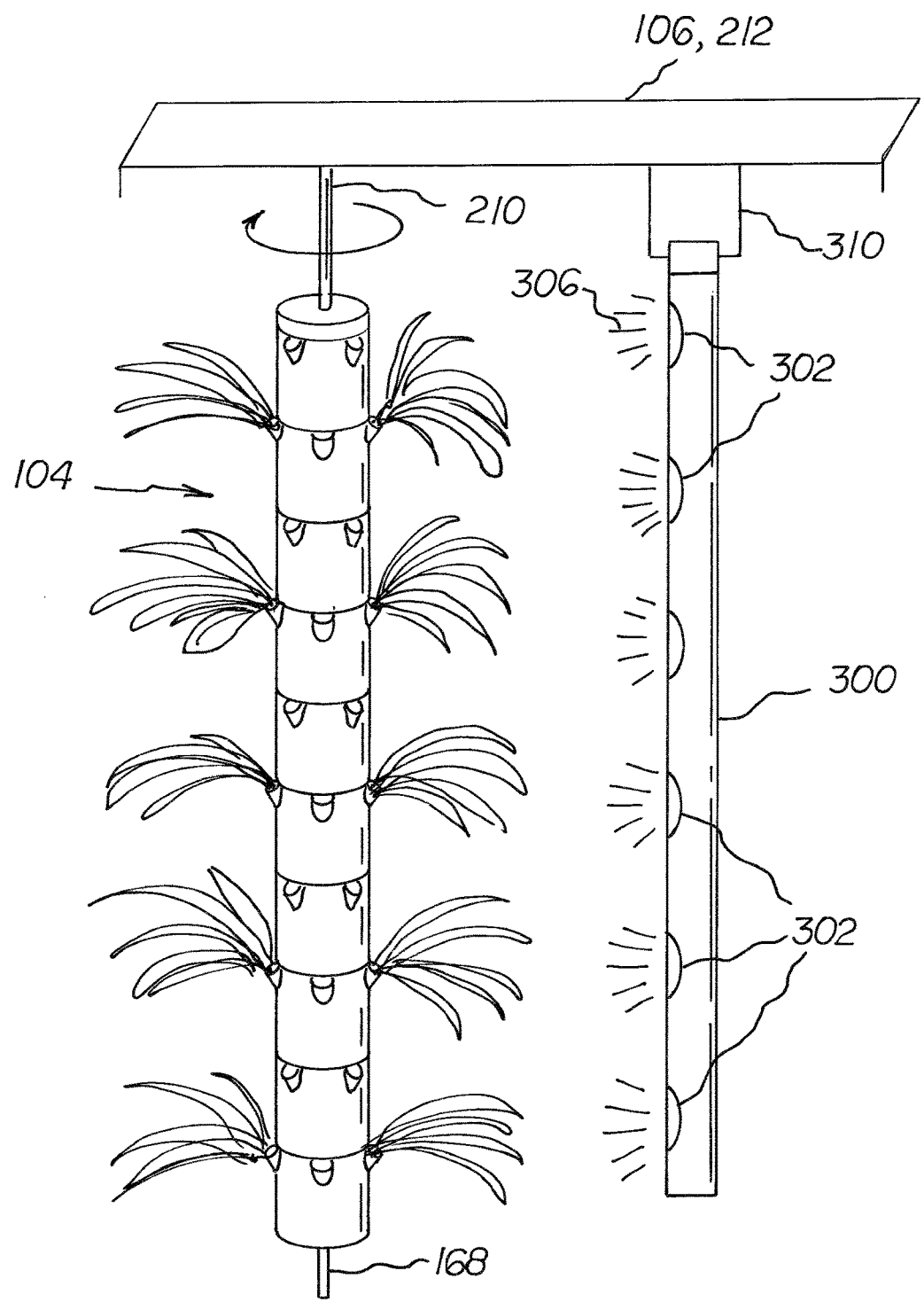
FIG. 7 is a perspective view of the light tower and growing tower.

FIG. 6 illustrates a vertical LED grow light tower 300. The tower 300 includes a plurality of lamps 302 disposed vertically along the light tower 300. Each lamp 302 includes a plurality of LEDs 304. The LEDs 304 are selected to emit a particular light with a beam spread that will produce the desired coverage 306 as shown in FIG. 7. The coverage 306 is typically about twelve inches for each lamp 302. Accordingly, the light tower 300 shown in FIGS. 6 and 7 may be used with the growing tower 104 of approximately six feet in height, for example. However, more than one light tower 300 may be used for taller growing towers 104. For example, a growing tower 104 that is twelve feet in height may require two light towers 300 configured one above the other to provide the desired coverage.

The lamps 302 illustrated are generally circular in shape, but could also be square or continuous from the top of the light tower 300 to the bottom. The light tower 300 may be suspended from the support channel 212 or overhead structure 106 using the aperture 308 or any other suitable means to support and orientate the light tower 300 in a vertical position relative to the growing tower 104.

Referring now to FIG. 7, the light tower 300 is shown suspended from the overhead structure 106 and/or channel 212 using a clip 310 or any other suitable connection. In addition, the growing tower 104 is shown suspended in front of the light tower 300. Some elements of the system 100 described above are not shown in FIG. 7 for purposes of clarity. The growing tower 104 is rotating so that plants 112 on all sides of the growing tower 104 are provided substantially equal light. By including LEDs 304 of different emission wavelengths in the LED lamps 302, the LED lamps 302 may be electronically-controlled to vary the intensity, times, durations, and wavelengths of emissions, to optimize plant growth.

The scope of the disclosed system 100 includes the use of LED light towers 300 as described above in addition to other forms of artificial lighting. This includes incandescent, fluorescent, narrowband, and broadband lighting sources that may be employed to illuminate the growing towers 104 in the absence of sufficient solar illumination. Light sensors may also be used to detect loss of adequate solar illumination in the vicinity of particular towers 104 or plants 112 and cause the light towers 300 to illuminate plants 112 automatically. Individual sensor-controlled lights may be deployed to illuminate a single pot 102 or pots, a single growing tower 104, or collection of towers. If a light tower 300 is chosen that fully illuminates the vertical grow tower 104 from top to bottom, the rotation of the tower 104 may be paused when using the light tower 300 for illumination. Hence, the system 100 can adapt in a number of ways to maintain adequate illumination of the plants 112 under varying environmental conditions such as intermittent cloud cover or nighttime.

The previous description of the disclosed embodiments is provided to enable any person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. An aeroponic growing system, the system comprising:
a vertical column of interconnected growing pots;
an overhead support to suspend the vertical column of interconnected growing pots;
a rotatable tower suspension shaft connected to the overhead support and the vertical column of interconnected growing pots;
a turning mechanism configured to rotate the rotatable tower suspension shaft and the vertical column of interconnected growing pots about a vertical axis of the vertical column of interconnected growing pots to achieve uniformity of illumination;
a supply conduit in constant fluid communication with a top of the vertical column of interconnected growing pots;
a return conduit in fluid communication with a bottom of the vertical column of interconnected growing pots; and
a reservoir in fluid communication with the supply conduit and the return conduit.

2. The system of claim 1, further comprising a nutrient enriched fluid to circulate through the system.

3. The system of claim 2, the turning mechanism comprising a horizontal driveshaft in communication with a motor to rotate the vertical column of interconnected growing pots.

4. The system of claim 3, further comprising a spacing bar disposed between adjacent vertical columns of interconnected growing pots.

5. The system of claim 4, further comprising an elongated support channel covering the turning mechanism.

6. The system of claim 5, further comprising a distributor head secured to a top portion of the vertical column of interconnected growing pots.

7. The system of claim 6, further comprising a regulator to adjust a temperature of the fluid circulating through the system.

8. The system of claim 7, wherein the system re-circulates the fluid.

9. The system of claim 8, further comprising a dosing system to add nutrients to water for replenishment of the fluid.

10. The system of claim 9, further comprising a fluid level sensor in the reservoir configured to automatically activate the dosing system for replenishment of the fluid when the fluid reaches a predetermined level in the reservoir.

11. The system of claim 1, further comprising a light tower, wherein the light tower is orientated vertically to emit light from a top of the vertical column of interconnected growing pots to the bottom.

12. The system of claim 11, the light tower further comprising light emitting diodes (LED) grow lights.

13. The system of claim 12, wherein the light tower is configured to vary intensity, times, durations and wavelength of emissions to optimize plant growth.

14. An aeroponic growing system, the system comprising,
a plurality of vertical growing towers, where the vertical growing towers are arranged in adjacent rows and columns;
a plurality of rotatable tower suspension shafts configured to suspend and rotate each of the vertical growing towers;
a turning mechanism configured to rotate each rotatable tower suspension shaft and respective vertical growing tower about a vertical axis of the respective vertical growing tower;
a supply conduit in constant fluid communication with a top portion of each of the vertical growing towers;
a return conduit in fluid communication with a bottom portion of each of the vertical growing towers; and
a reservoir in fluid communication with the supply conduit and the return conduit and configured to re-circulate a nutrient rich fluid through the vertical growing towers.

15. An aeroponic growing method, the method comprising:
forming a growing tower from a plurality of interconnected growing pots;
suspending the growing tower from a rotatable tower suspension shaft;
rotating the rotatable tower suspension shaft and the growing tower about a vertical axis of the growing tower;
supplying a nutrient rich fluid to a top portion of the growing tower;
collecting the fluid from a bottom portion of the growing tower after the fluid has traveled down the growing tower; and
recirculating the fluid to the top portion of the growing tower.

16. The method of claim 15, further comprising illuminating the growing tower from a top of the growing tower to the bottom to promote plant growth.

17. The method of claim 16, further comprising inserting plants into ports disposed on a periphery of the growing tower.

18. The method of claim 17, further comprising arranging a plurality of growing towers in adjacent rows that are rotated contemporaneously.

* * * * *